United States Patent
Jaubert et al.

(10) Patent No.: US 10,572,262 B2
(45) Date of Patent: Feb. 25, 2020

(54) REGISTER MAPPING OF REGISTER SPECIFIERS TO REGISTERS DEPENDING ON A KEY VALUE USED FOR MAPPING AT LEAST TWO OF THE REGISTER SPECIFIERS

(71) Applicant: ARM LIMITED, Cambridge (GB)

(72) Inventors: Jocelyn Francois Orion Jaubert, Antibes (FR); Frederic Jean Denis Arsanto, Le Rouret (FR); Guillaume Schon, Antibes (FR); Carlo Dario Fanara, Antibes (FR)

(73) Assignee: ARM Limited, Cambridge (GB)

( * ) Notice: Subject to any disclaimer, the term of this patent is extended or adjusted under 35 U.S.C. 154(b) by 247 days.

(21) Appl. No.: 15/651,158

(22) Filed: Jul. 17, 2017

(65) Prior Publication Data

US 2019/0018686 A1    Jan. 17, 2019

(51) Int. Cl.
*G06F 9/38*    (2018.01)
*G06F 9/30*    (2018.01)

(52) U.S. Cl.
CPC .......... *G06F 9/384* (2013.01); *G06F 9/30098* (2013.01)

(58) Field of Classification Search
CPC ............................. G06F 9/384; G06F 9/30098
USPC ....................................................... 712/217
See application file for complete search history.

(56) References Cited

U.S. PATENT DOCUMENTS

| 4,037,215 A * | 7/1977 | Birney | G06F 12/0292 711/164 |
| 2006/0037010 A1* | 2/2006 | Willoughby | G06F 8/441 717/151 |
| 2008/0148022 A1* | 6/2008 | Piry | G06F 9/384 712/217 |
| 2015/0058595 A1* | 2/2015 | Gura | G06F 12/1018 711/206 |
| 2018/0218166 A1* | 8/2018 | Cachin | G06F 21/602 |

OTHER PUBLICATIONS

May, D et al. Random Register Renaming to Foil DPA. Cryptographic Hardware and Embedded Systems, Sep. 20, 2001, pp. 28-38 [online], [retrieved May 14, 2019]. Retrieved from the Internet <URL: https://link.springer.com/content/pdf/10.1007%2F3-540-44709-1_4.pdf>.*

* cited by examiner

Primary Examiner — Aimee Li
Assistant Examiner — Shawn Doman
(74) Attorney, Agent, or Firm — Nixon & Vanderhye P.C.

(57) ABSTRACT

An apparatus comprises a set of registers and mapping circuitry to perform a mapping operation to map each of a set of register specifiers to a respective register from among the set of registers in dependence on a mapping function. The mapping function is dependent on a key value. In addition, the mapping for at least two register specifiers from among the set of register specifiers is dependent on the same key value.

19 Claims, 11 Drawing Sheets

|   | XOR (key 1) | Registers | |
|---|---|---|---|
| 0 | | 0 | 0 |
| 1 | | 1 | 0 |
| 2 | | 2 | 0 |
| 3 | | 3 | 0 |

R0 - R3 ZEROED AT INTERRUPT

FIG. 5A

|   | XOR (key 2) | Registers | |
|---|---|---|---|
| 0 | | | |
| 1 | | | |
| 2 | | | |
| 3 | | | |
| | | 4 | a |
| | | 5 | b |
| | | 6 | c |
| | | 7 | d |

ZEROED VALUES MOVED
BY REMAPPING

REGISTER MAPPING OF REGISTER SPECIFIERS TO REGISTERS DEPENDING ON A KEY VALUE USED FOR MAPPING AT LEAST TWO OF THE REGISTER SPECIFIERS

TECHNICAL FIELD

The present disclosure relates to the field of data processing. More particularly it relates to an apparatus for mapping a set of register specifiers to respective registers.

BACKGROUND

A data processing apparatus may perform a variety of data processing operations, some of which may include access to registers. In modern data processing systems a register file can contain sensitive information such as, encryption keys or decrypted data used for secure communication.

SUMMARY

In one example there is provided an apparatus comprising: a set of registers; and mapping circuitry to perform a mapping operation to map each of a set of register specifiers to a respective register from among the set of registers in dependence on a mapping function, wherein the mapping function is dependent on a key value, wherein the mapping for at least two register specifiers from among the set of register specifiers is dependent on the same key value.

In a further example, there is provided a method of operating an apparatus, comprising the steps of: accessing a key value for mapping each of a set of register specifiers to a respective register from among a set of registers in dependence on a mapping function, wherein the mapping function is dependent on a key value, wherein the mapping for at least two register specifiers from among the set of register specifiers is dependent on the same key value; and in response to a register access request specifying a given register specifier, accessing the register mapped to by that given register specifier in the mapping.

In a yet further example, there is provided an apparatus comprising: instruction decoder circuitry to decode instructions; a set of registers; and key change circuitry; wherein the instruction decoder circuitry is responsive to a key change instruction to generate control signals to control the key change circuitry to change a key value, the apparatus further comprises register access circuitry configured to access register data in a register identified by a register specifier, and the register access circuitry is configured to transform at least one of: the register data and the register specifier with reference to the key value.

BRIEF DESCRIPTION OF THE DRAWINGS

The present techniques will be described further, by way of example only, with reference to embodiments thereof as illustrated in the accompanying drawings, in which.

DESCRIPTION OF EMBODIMENTS

At least some embodiments provide an apparatus comprising: a set of registers; and mapping circuitry to perform a mapping operation to map each of a set of register specifiers to a respective register from among the set of registers in dependence on a mapping function, wherein the mapping function is dependent on a key value, wherein the mapping for at least two register specifiers from among the set of register specifiers is dependent on the same key value.

There are number of reasons why it may be advantageous to perform a mapping of a register specifier (architectural register) to a register (physical register), such as a register in a register file (register bank). In a simple processor a fixed register mapping may be used, where each register specifier directly identifies the corresponding register provided in hardware. However there arises a vulnerability to attacks in providing a fixed mapping, since an attacker may be able to derive information on the stored data associated with a given architectural register specifier using side channel power analysis for a given hardware register. The present techniques improve the security of a data processing apparatus by making it harder for an attacker to determine the mapping between each architectural register and a corresponding physical register. By mapping each register specifier in a set of register specifiers to a respective register based on a mapping function and a key, it becomes harder for an attacker to find a register containing sensitive data. In one example, the key value used by the mapping function can be stored in a secure part of the data processing apparatus, such as in an array of flip-flops, which can only be read internally by the mapping function, and cannot be accessed by an external instruction.

By using a common key for mapping a plurality of register specifiers, fewer flip-flops are needed to store how the registers are exchanged (compared to a rename table explicitly listing a separate physical register for each architectural register specifier), namely, in dependence on the key value for the mapping function. Such a rename table (sometimes used for remapping register specifiers to registers for performance reasons to eliminate register dependencies) is expensive in terms of the additional hardware and processing requirements necessary to implement it. In particular, maintaining a table specifying the physical registers explicitly for each architectural register requires a lot of bits to be maintained in the renaming table. The present techniques address this by using a key based approach which is more efficient (and therefore can be implemented on much lower capability processors) and additionally benefits from enhanced security. By using the same key value for mapping at least two register specifiers, the overhead of the mapping circuitry is reduced while providing protection against side channel attacks.

The register specifiers may also be referred to as "architectural registers" since they refer to the registers as identified by instructions of the instruction set architecture, in contrast to the registers themselves which are physical registers provided in hardware.

In addition, by using a single key value for mapping at least two register specifiers, it is possible to decrease the time required to perform the register mapping, since there is no need to lookup the mapping in a translation table. Instead, the mapping function can be implemented with a relatively simple set of logical manipulations to perform the mapping of an architectural register to obtain the position of a relevant entry (register) in the register file. Hence, by providing that the mapping for at least two register specifiers is dependent on the same key value, it is possible to improve the efficiency of register mapping and help improve timing requirements.

In some examples, the mapping circuitry is arranged to select, in dependence on the register specifier, a subset of the key value to determine the specifier-to-register mapping for a particular register specifier.

The key value may contain a plurality of key subsets (portions), with the subset of the key value used to determine the specifier-to-register mapping for a given register being selected by the mapping circuitry based on the register specifier. Hence, for a given register specifier, the corresponding subset of the key value is selected and that subset of the key value is used to determine the mapping of the given register specifier to a corresponding register (a number of different register specifiers may share the same key subset). The key value may further contain a number of other groups of subsets which are indicative of a mapping for other register specifiers from among the plurality of register specifiers. Accordingly, each register specifier has a corresponding subset of the key value to be used for register mapping; however each subset may be used by at least two register specifiers.

This means that the security of data processing can be improved since it is harder to deduce the register mapping of each architectural register to its corresponding physical register if not all of the architectural register use the same key value (in particular, if not all architectural registers use the same subset of the key value to determine the physical register to map to).

In some examples, the mapping circuitry is configured to map a subset of bits of the register specifier to corresponding bits of a register index identifying the respective register, using a common key value portion used by all the register specifiers, and to select the subset of the key value used to map remaining bits of the register specifier in dependence on said subset of bits of the register specifier.

The key value is arranged to comprise a portion which is a common key value portion used by each of the plurality of register specifiers. The common key value portion may have a predetermined size and can be used to map a block of register specifiers to a block of registers. In addition, the subset of the key referred to previously is used to map a register specifier within the mapped block to a specific register within the corresponding block of registers. The mapping function is dependent on a subset of the key value selected in dependence on the subset of bits of the register specifier, to map the remaining portion of the register specifier to a register.

The subset of the key value which is used to perform the mapping of the register specifiers in a register specifier block is selected on the basis of the mapping of the register specifier block. That is, the subset of the key value used to remap a second portion of the register specifier could be selected based on the bits of a first portion of the register specifier remapped using the common key value portion of the key. By using a common key value portion for all register specifiers, it is possible to ensure that each block of register specifiers are mapped onto a different block of registers, even if different subsets of keys are then used for the respective blocks of register specifiers to remap register specifiers to registers within that block. Providing entirely different key values for each register specifier could lead to a mapping that would map multiple register specifiers onto the same register, in contrast by using a common key value portion this therefore enables block-by-block mapping to ensure that each register specifier is mapped to a distinct register without any many-to-one mappings or one-to-many mappings. Note that while the subset of the key value to use for a given block may be selected based on the bits of a first portion of the register specifier, it is not essential to perform the selection of the subset before any transformation has been applied to the first portion of the register specifier—in some examples the selection could take place based on the transformed version of the first portion after a remapping of the first portion based on the common key portion has been performed.

In some examples, the set of registers comprise a plurality of register blocks and the set of register specifiers comprise a plurality of register specifier blocks, and the mapping circuitry is configured to determine a specifier-block-to-register-block mapping, wherein the specifier-block-to-register-block mapping maps a selected register specifier block to a corresponding register block.

By performing block-by-block mapping between register specifier blocks and register blocks, it is possible to improve the security of register mapping (by providing different keys to each block of register specifier) while also allowing each register specifier maps to a unique register.

In some examples, the specifier-block-to-register-block mapping is determined in dependence on the mapping function and a common key value portion of the key value used by all the register specifiers.

The specifier-block-to-register-block mapping may be determined by the mapping function in dependence on the common key value portion. This allows each register specifier to be mapped to a unique register without requiring a unique key for each register specifier.

In some examples, the key value comprises a plurality of specifier-mapping portions and a given specifier-mapping portion from among the plurality of specifier-mapping portions is used to determine the mapping of each register specifier within a corresponding register specifier block.

In addition to the common key value portion to be used for specifier-to-register mapping, a specifier-mapping portion from among a plurality of specifier-mapping portions of the key value is used to map the register specifiers within a given register specifier block to a plurality of registers in the corresponding block. Hence, for a register specifier comprising N register specifier blocks, there may be N specifier-mapping portions of the key value. For a specifier-mapping portion comprising Z bits, there are $2^Z$ register specifiers (or fewer) in the register specifier block in order to perform a specifier-to-register mapping. Hence, since there are a plurality of specifier-mapping portions which are each used to map the register specifiers in a given register specifier block (rather than a single key value being used to map all register specifiers in all blocks), the security of register mapping can be improved since there is more variety in register mapping.

In some examples, the apparatus further comprises mapping update circuitry to perform a mapping update operation to update at least a portion of the key value to change a specifier-to-register mapping for a plurality of register specifiers from among the set of register specifiers, wherein the mapping update circuitry performs the mapping update operation to update a selected specifier-mapping portion from among the plurality of specifier-mapping portions.

Since the key value comprises a common key value portion and a plurality of specifier-mapping portions, these portions can be independently updated. Hence, the updating can be performed to update the mapping of register specifier blocks or the mapping of register specifiers within a given block. This allows the security of a data processing apparatus to be improved by changing the key value in order to change the mapping of register specifiers to registers. Allowing each of the specifier-mapping portions of the key to be updated independently can be useful, because it means that it is possible to update a portion of the key even if less than the whole register file is in a state in which it is suitable to change the key (e.g. as discussed below changing the key may be more efficient if the registers in the relevant portion of the register file are set to the same value or have dummy values or other values which do not matter if they are lost). By updating the mapping of only a portion of the register specifiers at a time (for example, the register specifiers in a single block, by updating the specifier-mapping portion of the key used to map that block), it is possible to update the mapping more often, since it is not necessary to wait until every register is in a state suitable for being updated. Hence, security can be improved by enabling the mapping of register specifiers to be updated more frequently. Accordingly, even if an attacker at one point is able to determine the mapping of one block of register specifiers, the mapping for that block is more likely to be able to be changed more frequently to make the mapping known by the attacker redundant.

In some cases, there may be a preference not to update the mapping of all register specifier blocks at once (for example, due to a performance requirement), in which case a portion of the key value, such as a specifier-mapping portion, can be updated, to update only the mappings within a corresponding register specifier block.

In some examples, the mapping function comprises a bijective function. The mapping function can be bijective in that each element of the set of input elements to the function may be mapped to exactly one element of the output set of elements. In this case, by using a bijective function as the mapping function, it is possible to ensure that there is a one-to-one mapping between each register specifier and each register and hence, that each register specifier is interpreted to map to only one register and that all register specifiers have a different register mapped to them. The mapping function may comprise at least one of an XOR operation, an addition operation or a shift operation, among others. It will be appreciated that an addition operation also includes a subtraction operation. In addition, multiple bijective functions may be used together, such as in succession to each other.

In some examples, the mapping function may be bijective, yet not every register ID may be used. For example, there may be 16 register specifiers and 16 registers, but only 14 of the registers may actually be used, while the mapping for the remaining 2 registers may be ignored. This can be due to an alternative use for each of the remaining registers (for example, use as a program counter, for which it may be more efficient to allocate a fixed hardware register to store the program counter, so that instructions specifying the register specifier of the program counter may always access the program counter register regardless of the key value).

In some examples, the mapping circuitry is configured to determine a register index of a physical register to be accessed in dependence on a given operation applied to a target register specifier and the key value, said given operation comprising at least one of: an XOR operation, and an addition operation.

The mapping circuitry can perform a mapping of a target register specifier to an index of a physical register, and the mapping function performed by the mapping circuitry in order to determine the index of the physical register may comprise an XOR operation and/or an addition operation, among others. In addition, a shift operation may be used. It will be appreciated that an addition operation also includes a subtraction operation. By using an XOR operation or an addition operation, an efficient and mapping function can be used to determine a mapping quickly. In addition, this provides a bijective mapping function, such that each register specifier maps to a single distinct register.

In some examples, the apparatus further comprises mapping update circuitry to perform a mapping update operation to update at least a portion of the key value to change a specifier-to-register mapping for a plurality of register specifiers from among the set of register specifiers.

This allows the security of a data processing apparatus to be improved by changing the key value in order to change the mapping of register specifiers to registers.

In some examples, the mapping update circuitry is configured to perform the mapping update operation in response to at least one of: a predetermined event which causes the registers within at least a portion of the registers to contain at least one of: the same value, and respective dummy values; and a hardware reset event.

A number of predetermined events which cause a portion of the registers to contain the same value or dummy values may be used. For example, at least a portion of the registers, such as registers R0 to R3, may be zeroed (set to zero or a null value). Alternatively, they could be set to dummy values, such as random values, or meaningless values. By doing so, it is possible to avoid the performance overhead of swapping the contents of the registers which have an updated mapping (which would otherwise be required if the architectural state values stored in the registers are to continue to be associated with the correct architectural register specifiers following the change of the key value). Hence, if it is known that the relevant registers associated with the portion of the key to be updated contain the same value or dummy values, there is no need to update the contents of the relevant registers when a remapping is performed since correct architectural state does not depend on the contents of those register being updated. This means that performance can be improved by reducing the number of register reads/writes required when updating the key.

In some examples, the predetermined event comprises an interrupt.

Alternatively, the predetermined event may comprise an exception. Some architectures are configured to automatically clear the values of a subset of registers upon certain interrupts or exceptions in order to prevent another thread from seeing values used by a previous thread in the registers (it is not essential for all the registers in the register file to be cleared, as to limit the performance impact of the register clearing the architecture may only guarantee that a certain part of the register data will be hidden from other threads, so that the previous thread has responsibility not to write sensitive information to other architectural registers that will not be cleared on an exception). Accordingly, there is a performance advantage in performing a mapping update operation when an interrupt (or exception) is performed, since the mapping can be updated when the contents of a block of registers are cleared (e.g. zeroed) by the architecture, so that it is not necessary to perform additional reads/writes to exchange the positions of data in the registers in order to move architectural state from the hardware register previously mapped to a given architectural register specifier to the hardware register newly mapped to the given architectural register specifier.

In some examples, the mapping update circuitry is configured to perform the mapping update operation in response to a remap instruction.

An instruction can also trigger the remap operation, such as a remap instruction. This provides additional security by enabling a remap to be explicitly triggered by the programmer if there is a particular need to improve the security of the contents of at least one register at a certain point of the program.

In some examples, in response to the remap instruction, the mapping update circuitry is configured to trigger changing of the position of the register data in each of the plurality of registers according to the new mapping.

When a mapping update operation (remap) takes place, there might be a need to update the location of the data previously contained in each of the registers to correspond to the new mapping. Hence, by triggering the changing of the position of the register data in the registers when the mapping update circuitry is performed, it is possible to maintain consistency in the architectural data pointed to by each register specifier so that the values accessed by an instruction specifying a given architectural register remain the same regardless of whether the key has been changed. For example, the remap instruction may behave, from an architectural point of view, as a no-operation (NOP) instruction, which does not have any effect on the architectural state of the processor, but which triggers the micro-architecture to update the key and exchange the positions of data in the registers.

In some examples, in response to the remap instruction, the mapping update circuitry is configured to trigger setting of the register data in each of the plurality of registers to be at least one of: the same value, and respective dummy values.

In some cases, all existing data in the plurality of registers may be removed, for example, if they contain sensitive information which an attacker may wish to gain access to. For example, each register can be set to contain dummy values (e.g. random values or any other value uncorrelated to the previous register contents) or the same value. By providing a form of the remap instruction which triggers each register to be reset to the same value or to dummy values, the performance of updating register mapping can be improved, since there is no need to read the previous values of the registers as would be the case if the architectural state is to be retained. Hence, the number of cycles required to perform register mapping can be reduced. The programmer can choose to use this form of the remap instruction if it is not required to retain architectural state following the remapping.

In some examples, the number of registers in the set of registers matches the number of register specifiers in the set of register specifiers. It will be appreciated that in some examples, not all of the registers will be used. Unlike with rename-table based register renaming, where a larger physical register file is typically provided with many more registers than the number of architectural register specifiers, the inventors recognised that providing mapping circuitry can be useful even in a register file with the same number of physical registers as the number of architectural registers, such as would be used in a less complex processor which is too low resource to support rename-table based register renaming, since providing the mapping circuitry enables security to be improved by reducing the likelihood that an attacker can derive the relation between the stored data value and the architectural register specifier from side-channel attacks using differential power analysis.

In some examples, the apparatus further comprises: data masking circuitry to transform data written to, or read from, a given register according to a masking key value.

In addition to providing register remapping, an additional security feature is to provide data masking to encode the contents of each of the plurality of registers by applying a masking operation. The masking operation transforms the data being written to or read from a given register and is dependent on masking function and a masking key. The masking operation may comprise at least one of a bit-wise encoding operation, an XOR operation, an addition/subtraction operation and a shift operation and is performed using the masking key value and the data. In some examples, the masking key value may be the same as the key value. However, security can be improved further by using different keys for the data encryption/decryption and the register specifier mapping respectively.

By providing this data masking circuitry, it is possible to further improve the security of data processing by encrypting data stored in the registers. Hence, for an attacker to gain access to the plaintext of sensitive data for a given architectural register, they are required to determine the masking key, in addition to resolving how the register specifiers have been remapped based on the key value.

In some examples, the apparatus further comprises: mask-update circuitry to change the masking key value in response to a mask-update trigger condition.

By changing the masking key value, the security of data processing can be further improved, in that an attacker who has determined a masking key value will be unable to indefinitely use that same masking key to transform data in the registers. Indeed, it would be necessary for the attacker to determine the current masking key value each time it is changed.

In some examples, the mapping circuitry performs the mapping operation during at least one of an issue stage, execute stage and write-back stage in an instruction pipeline.

This means that the performance of register mapping can be improved by being performed at a time of register access rather than in an additional dedicated renaming stage in the pipeline. A renaming stage would incur a performance penalty of at least one additional cycle per pending instruction in the pipeline (e.g. due to the longer time required for accessing an entry in a rename table). Hence by avoiding this, performance can be improved.

Some particular embodiments are now described with reference to the figures.

Figure 1:
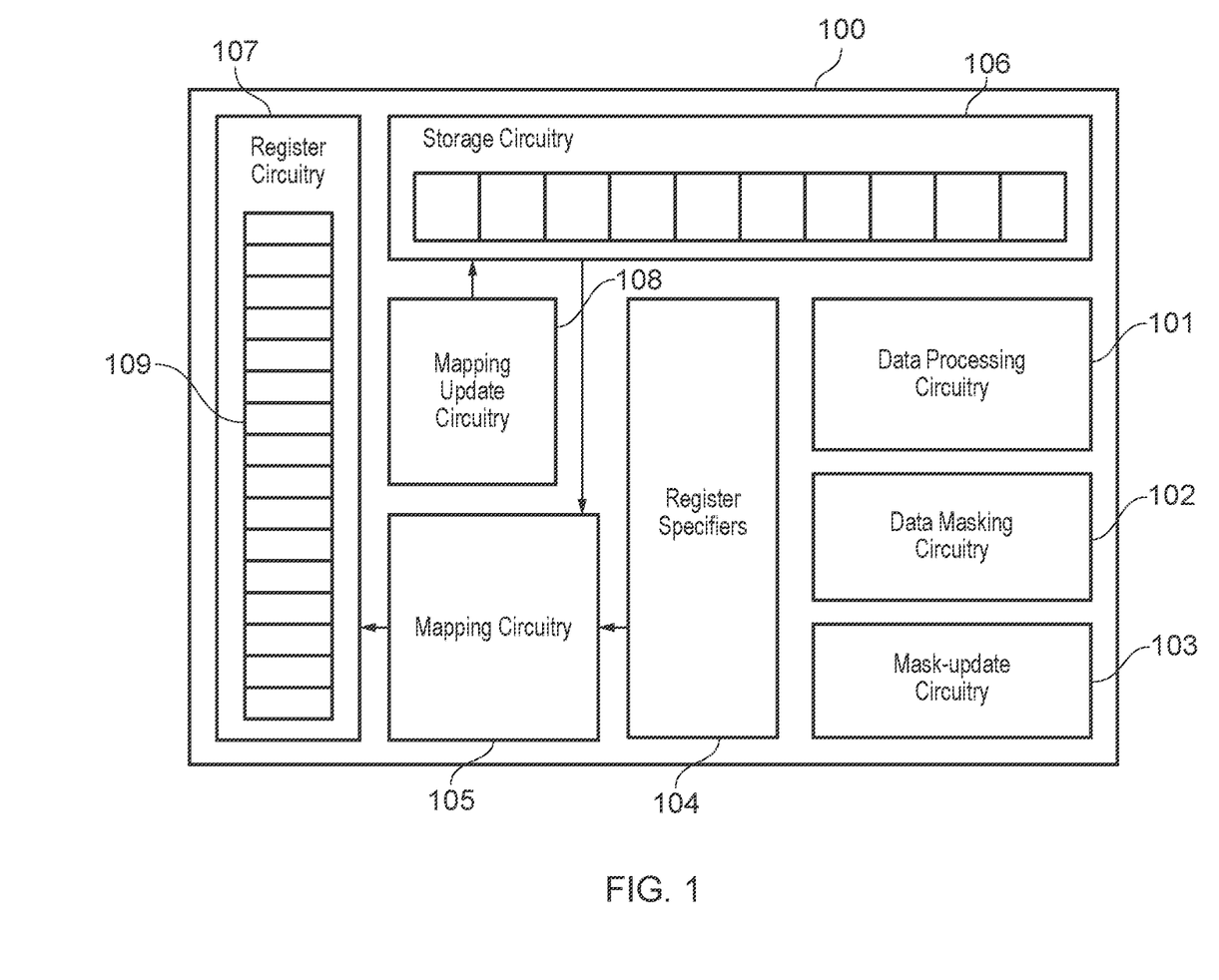
FIG. 1 schematically illustrates an apparatus according to one example.

FIG. 1 schematically illustrates an apparatus 100 according to one example comprising data processing circuitry 101, data masking circuitry 102 to transform data stored in register circuitry 107 in dependence on a masking key; mask-update circuitry 103 to update the value of the masking key; mapping circuitry 105 to perform register mapping of register specifiers 104 to registers stored in the register circuitry 107; storage circuitry 106; and mapping update circuitry 108 to update a key value used by the mapping circuitry 105. The data masking circuitry 102 is arranged to perform a masking operation on the data in the register circuitry 107 to encode the data with a mask. The mask-update circuitry 103 is configured to update a mask key value used by the masking operation. The register circuitry 107 comprises a plurality of physical registers 109 which are mapped to by the mapping circuitry 105 with reference to the register specifiers 104.

Figure 2:
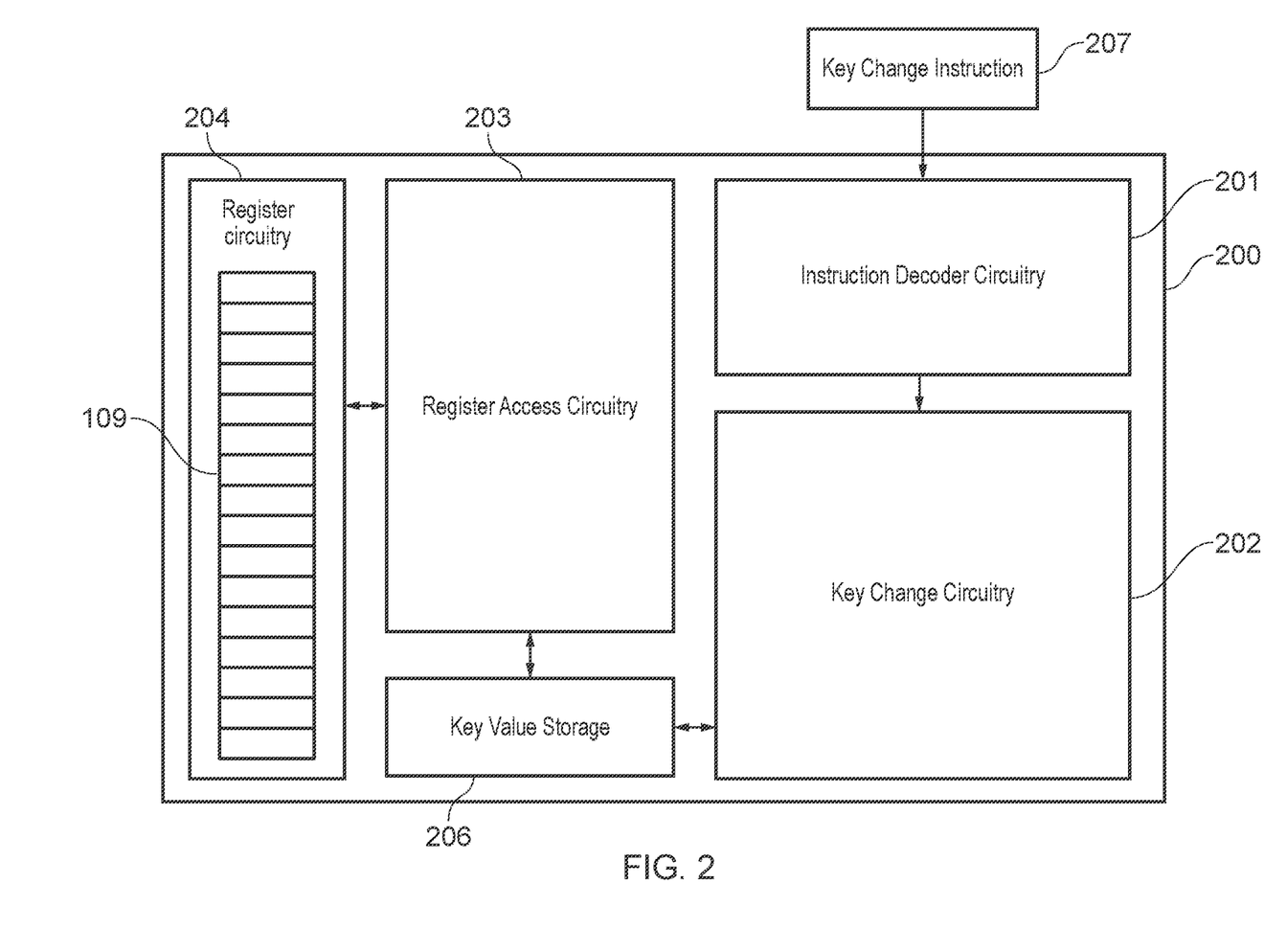
FIG. 2 schematically illustrates an apparatus according to another example.

FIG. 2 schematically illustrates an apparatus 200 according to one example comprising register circuitry 204, and instruction decoder circuitry 201 to decode instructions, for example a key change instruction 207, and to supply control signals to key change circuitry 202 which is configured to perform a key change operation. The apparatus 200 also comprises key value storage 206 to store a key value to be used by register access circuitry 203. The register access circuitry 203 is configured to transform register data or a register specifier with reference to the key value stored in the key value storage 206.

Figure 3:
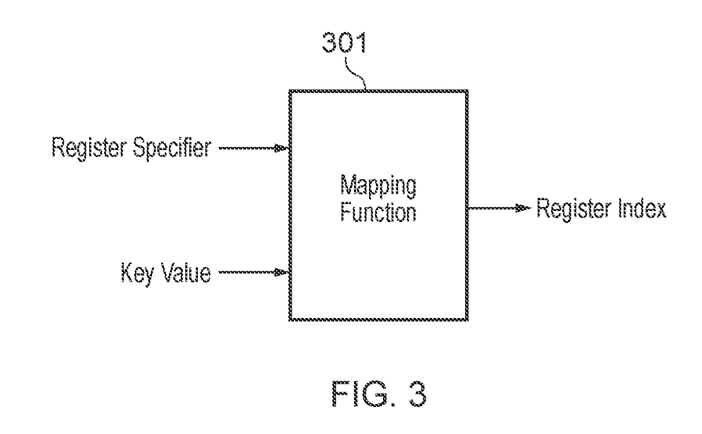
FIG. 3 illustrates the behaviour of a mapping function.

FIG. 3 illustrates a mapping function 301 which is dependent on a key value. A register specifier is input into the mapping function 301 and the mapping function 301 determines a corresponding register index. In one example, the mapping function 301 could correspond to an XOR of the register specifier with the key value. In another example, the mapping function 301 could correspond to adding the key value to an N-bit register specifier and taking the lowest N bits of the sum as the register index to be used for accessing a hardware register. Some examples of the mapping function could also apply a left or right shift, e.g. by a number of bits specified by the key value.

Figure 4A:
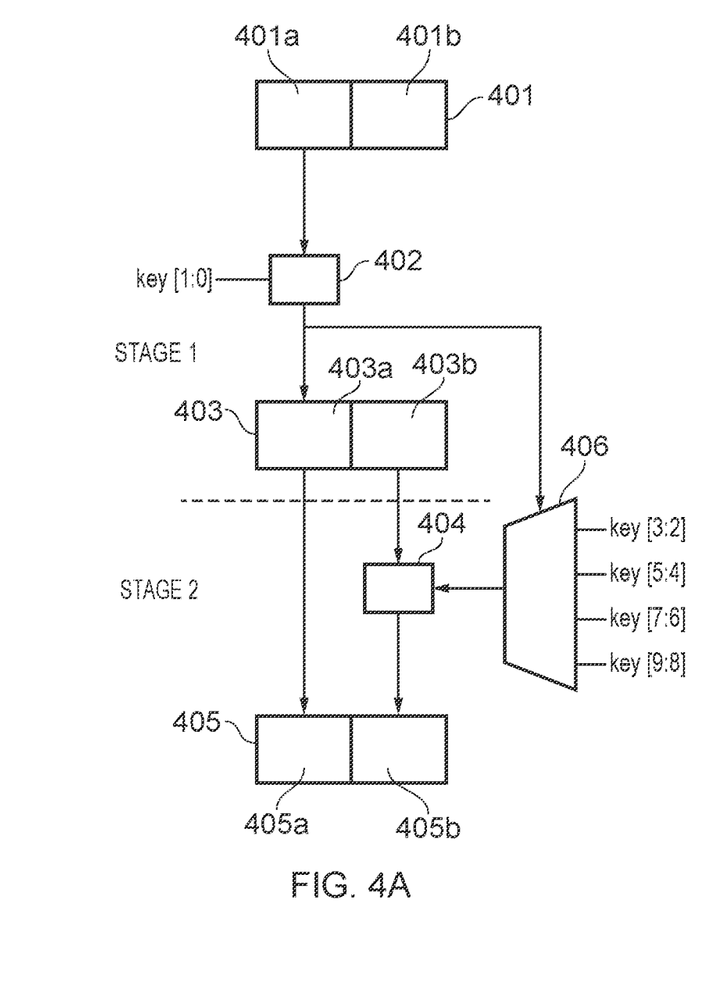
FIG. 4A illustrates two stages of the mapping operation and the use of a plurality of subsets of the key value.

FIG. 4A illustrates a particular example of the mapping function 301, which corresponds to an operation comprising two stages. In stage 1, a register specifier 401 is shown comprising two portions (a block-mapping specifier portion 401a and a specifier-mapping specifier portion 401b). The block-mapping specifier portion 401a is a portion of the register specifier to be mapped to a block-mapping register portion 403a of an intermediate value 403 by a first mapping function 402. The first mapping function 402 is dependent on a common key value portion of the key value, for example, key [1:0] which is a portion of the key value for mapping register specifier blocks to register blocks. A specifier-mapping specifier portion 403b of the intermediate value matches the specifier-mapping specifier portion 401b of the register specifier 401.

In stage 2, a second mapping function 404 is used to generate a register-mapping register portion 405b of the register index 405. A given specifier-mapping portion is selected by a selection unit 406 to be input into the second mapping function 404. The selection unit 406 selects the specifier-mapping portion based on the value of the block-mapping register portion 403a output by the first mapping function 402. Hence, the specifier-mapping portion of the key value is determined based on the block which the register specifiers being mapped are part of. It will be appreciated that stage 1 and stage 2 could be performed in parallel by manipulating each subset of bits of the register specifier with the respective mapping key portion in parallel, instead of sequentially as shown in FIG. 4A. Again, the first and second mappings functions 402, 404 could be XOR, addition/subtraction, shifts, etc. The first mapping function 402 could be the same as the second mapping function 404, or the first and second mapping functions 402, 404 could be different.

Accordingly, in some examples of the present technique, the mapping circuitry 105 performs a block-by-block mapping (stage 1) and also performs a specifier-register mapping for each specifier within each respective register specifier block (stage 2).

Figure 4B:
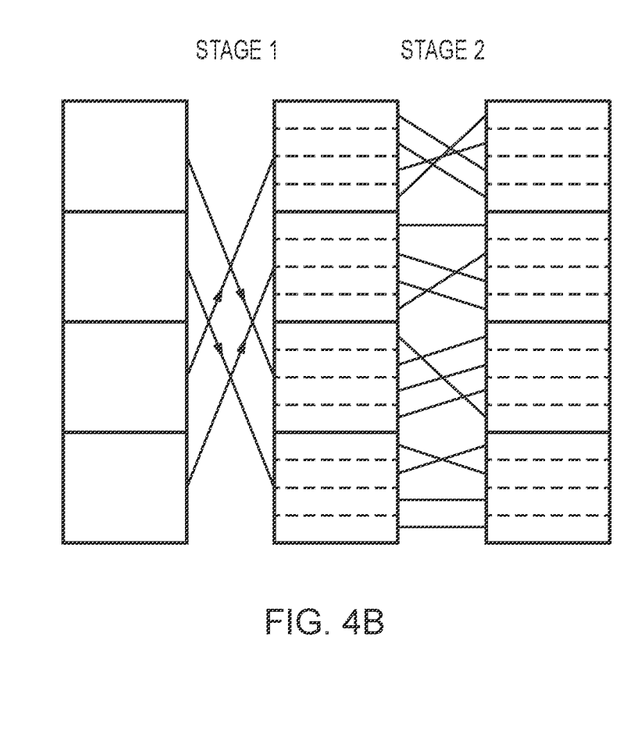
FIG. 4B illustrates the two stages of the mapping operation, in particular the mapping of a plurality of register blocks and the mapping of a plurality of register specifiers within each of the plurality of register blocks.

FIG. 4B illustrates the block-by-block mapping (stage 1) and specifier-register mapping (stage 2) performed by the mapping circuitry 105. As shown in stage 1 of FIG. 4B, the mapping of a register specifier block to a register block maps all of the register specifiers in one block to the same register block indicated in the intermediate value. Further in stage 2, the mapping of each register specifier to a register is performed intra-block. In other words, the second mapping function maps register specifiers in one block to registers within the same block.

Figure 5A:
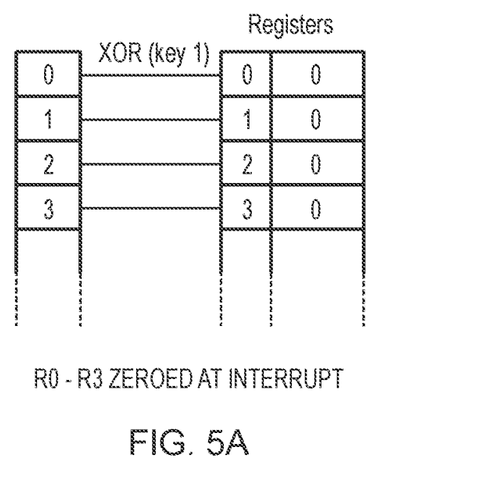
FIG. 5A illustrates the zeroing of registers R0-R3 when an interrupt is triggered.
Figure 5B:
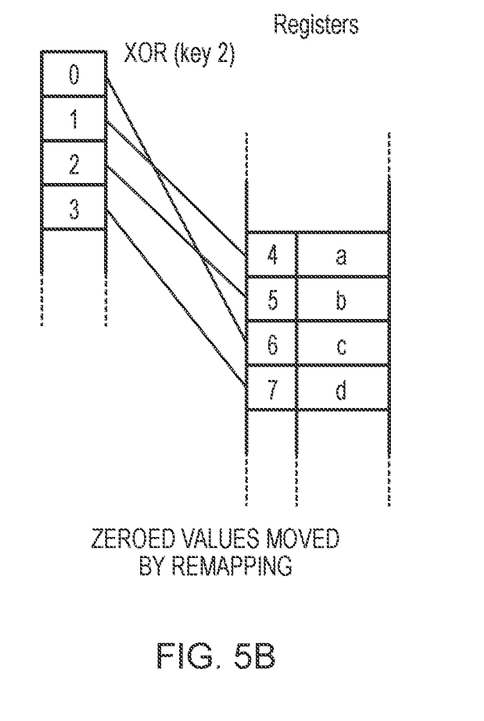
FIG. 5B illustrates the mapping of the zeroed registers after a key change.

FIGS. 5A and 5B illustrate the zeroing of a set of registers when an interrupt is called. In some examples, an interrupt may trigger a set of architectural registers (such as architectural registers R0 to R3) to be set to zero or cleared. This is shown in FIG. 5A which illustrates architectural registers R0 to R3 being set to zero. Prior to a key value change, architectural register specifiers R0 to R3 map to physical registers 0 to 3. FIG. 5B illustrates the mapping of those registers after a key value change (remap) has taken place. As shown, the values of the registers which register specifiers R0 to R3 map to are the same, however those values are now stored in physical registers 4 to 7 due to the remap. In this situation, even if the specifier-register mapping has been updated based on a change in the respective specifier-mapping portion of the key value, there is no need to guarantee the data values in each register correspond to the values previously mapped to by the previous respective register specifiers, and it is also not necessary to change the data values in the new physical registers 4 to 7 mapped to R0 to R3. This is because, in response an interrupt, all the data values associated with architectural registers R0 to R3 are set to zero, and so the software executed after the interrupt would assume, as prescribed by the instruction set architecture, that it would need to write new values to architectural registers R0 to R3 before proceeding with any register accesses to those architectural registers. Hence, software correctly written according to the ISA would include a register write to architectural registers R0 to R3 before any subsequent read to those registers, so that it does not matter if other data a, b, c, d is in the corresponding physical registers following the key update, as this data will be overwritten.

Figure 6A:
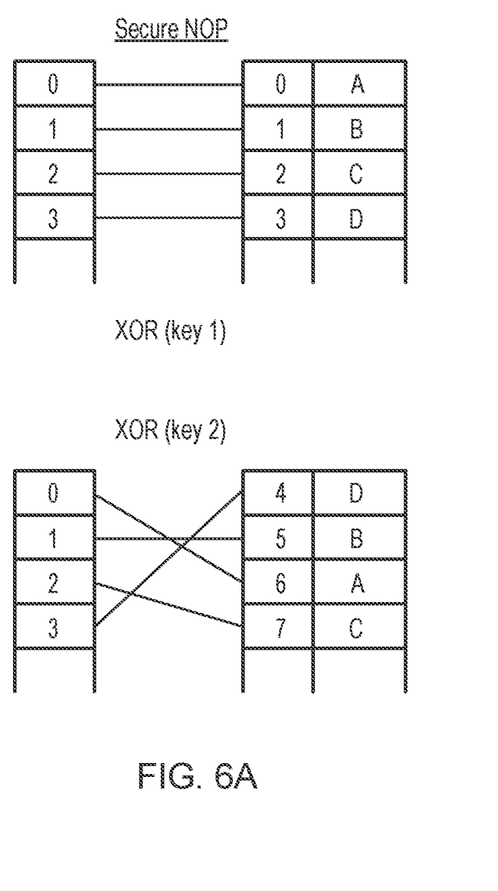
FIG. 6A illustrates the updating of register values according to one example.

FIG. 6A illustrates a "Secure NOP" operation performed in response to one example of a remap instruction according to one example of the present technique. In this examples, the hardware executes the steps of: recording a new key value for data-masking; recording a new key value for register renaming (register mapping); exchanging the data in each register from a previous register position to a new register position and re-masking the new data by the new masking key value. It will be appreciated that such an operation does not need to include all of the steps mentioned above. For example, as illustrated in FIG. 6A, the "Secure NOP" operation performed a mapping update operation to update the mapping of at least register specifiers R0 to R3 to a new set of registers by replacing the key value (previous key1) with a new key value (now key2). Accordingly, the data in the corresponding registers has been changed to ensure the same register specifiers point to the same data in the new register positions. Hence, the effect of the secure NOP instruction is that of an architectural NOP operation since the architectural state data remains unchanged—e.g. an instruction specifying register specifier R0 continues to access data value A regardless of the key update.

Figure 6B:
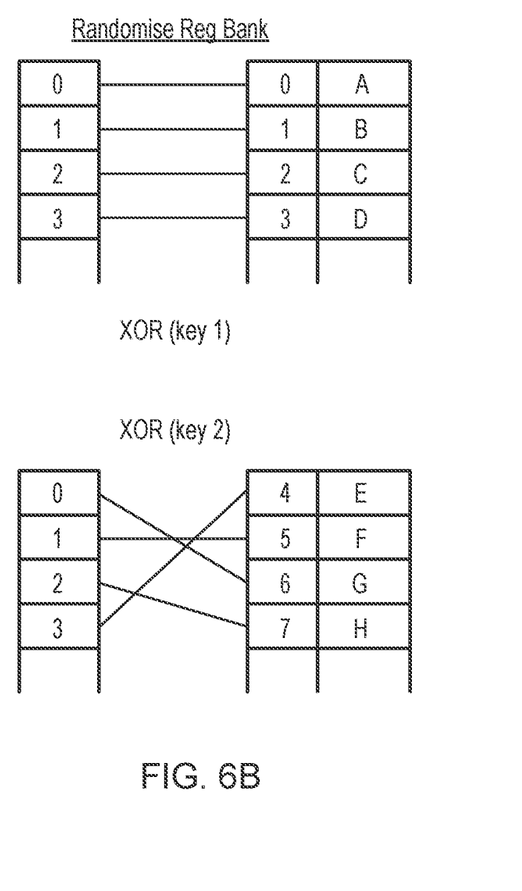
FIG. 6B illustrates setting register values to random values according to one example.

FIG. 6B illustrates a "Randomise RegBank" operation according to one example of the present technique. In this example, the values written back to the registers are random instead of the previous values. This means that an attacker would have to start from a completely random register state rather than a known state. This makes it harder for the attacker to determine masking or mapping key values. In this context, the term "random" is intended to include pseudo-random, so does not need to be generated using a hardware random number generator. In other examples, dummy values could be written to the registers, e.g. identical dummy values in each register, or any other arbitrary values, so the dummy values do not need to be random or pseudorandom.

This operation may be performed in situations in which current values stored in the registers is not important, for example, following a reset, or on a context switch when the data in the registers is associated with an old thread and so is irrelevant to the new thread. As shown, the "Randomise RegBank" operation sets the values in a set of registers to be equal to a new set of random values represented by placeholders E, F, G, and H. It will be appreciated that these will not be the actual values in the registers, but merely indicate a random set of values which are different from the values previously in these registers.

Figure 7:
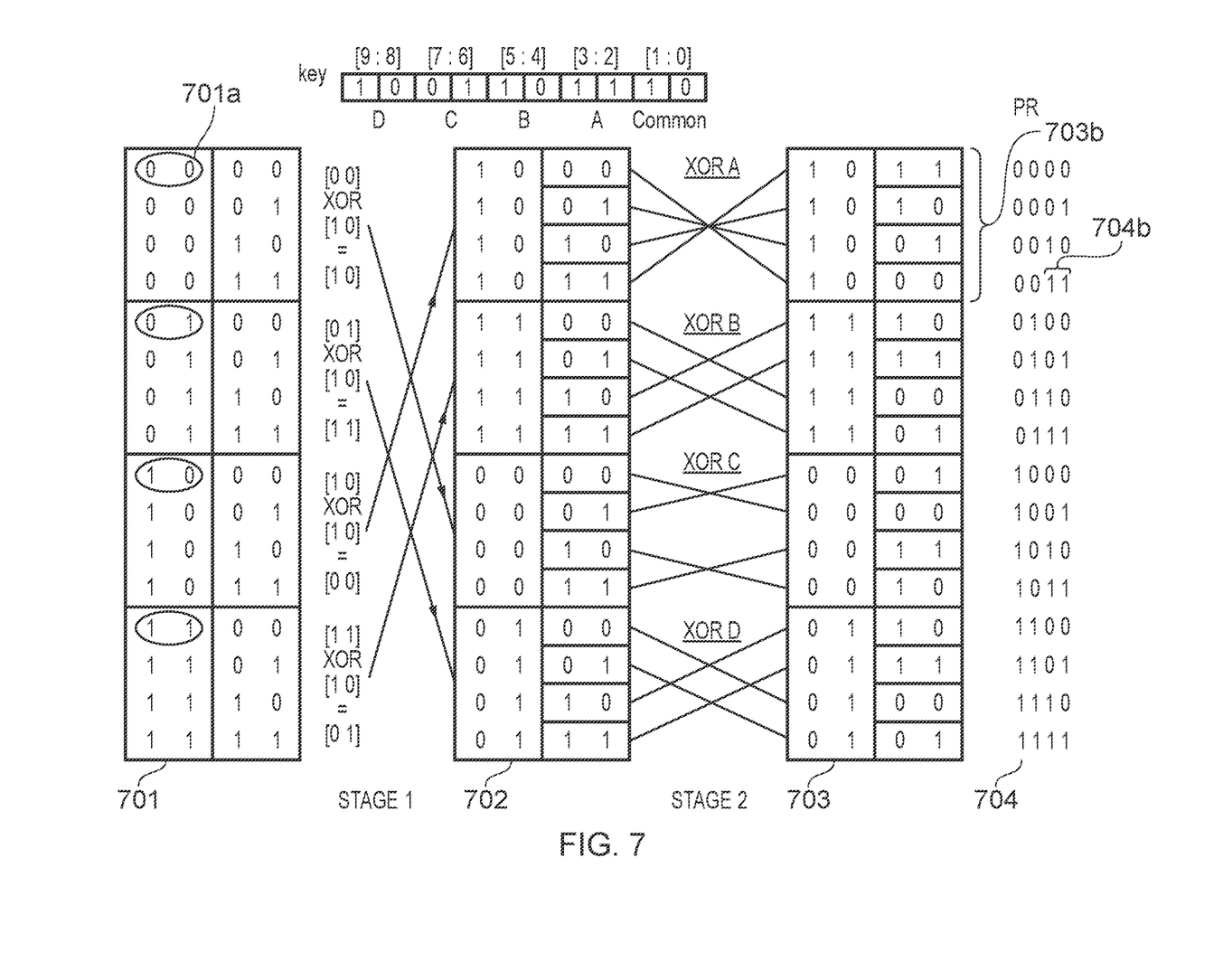
FIG. 7 shows a worked example of a mapping operation in which a key value is used to map a block of register specifiers, and to map individual register specifiers to respective registers.

FIG. 7 illustrates a worked example of the mapping operation, using the two stage example shown in FIGS. 4A and 4B discussed above. In particular both stage 1 and stage 2 of an example mapping operation are shown (again, while these are shown sequentially, both stages could also be done in parallel). As illustrated, a key value comprises a common key value portion (indicated by the word "common" for key[1:0]) and respective specifier-mapping portions (wherein A=key[3:2], B=key[5:4], C=key[7:6] and D=key[9:8]). FIG. 7 illustrates in respect of stage 1 of the mapping operation, that each register specifier block in the plurality of register specifiers 701 is mapped to a register block as indicated by the plurality of intermediate values 702. For a given register specifier block, the block-mapping specifier portion 701a is used to determine the register block to map the register specifier block to. This is done by performing an XOR operation of the block-mapping specifier portion 701a and the common key value portion. For example, the first block-mapping specifier portion 701a [0 0] is an input to an XOR operation along with the common key value portion [1 0] to output [1 0] indicative of the third register block.

In stage 2 illustrated in FIG. 7, the specifier-mapping portion of each of the intermediate values of the plurality of intermediate values 702 are input to an XOR operation along with a respective specifier-mapping portion of the key value in order to generate the register-mapping portion of each of the plurality of register indices 704. For example, in the first block of intermediate values, the first specifier-mapping portion [0 0] is input to an XOR operation along with the respective specifier-mapping portion of the key value A=[1 1] and is therefore mapped to the register index [1 1] 703a of the first register block 704b.

Hence, the box 701 in FIG. 7 shows the initial set of architectural register specifiers. Box 702 shows the reordered set of architectural register specifiers after stage 1 remapping has been performed. Box 703 shows the reordered set of architectural register specifiers after stage 2 remapping has been performed, and the list 704 at the right hand side of FIG. 7 shows the physical register indices now mapped to the reordered set of architectural register specifiers shown in box 703. It will be appreciated that in practice, it is not essential to actually calculate the reordered set of architectural register specifiers shown in box 702, as stages 1 and 2 can be performed in parallel on the respective subsets of bits of the architectural register specifiers, to map direct from the architectural register specifiers 701 to the physical register indices 704. Also, it will be appreciated that the mapping shown for the entire set of register specifiers 701 is schematic, and in practice for a given instruction only a single remapping of one of the register specifiers to a corresponding physical register index is performed by the mapping circuitry 105, e.g. if the instruction specifies architectural register specifier 0000 (R0) then this will be mapped to physical register 1001 (P9) as shown in the mapping between box 703 and list 704.

Figure 8:
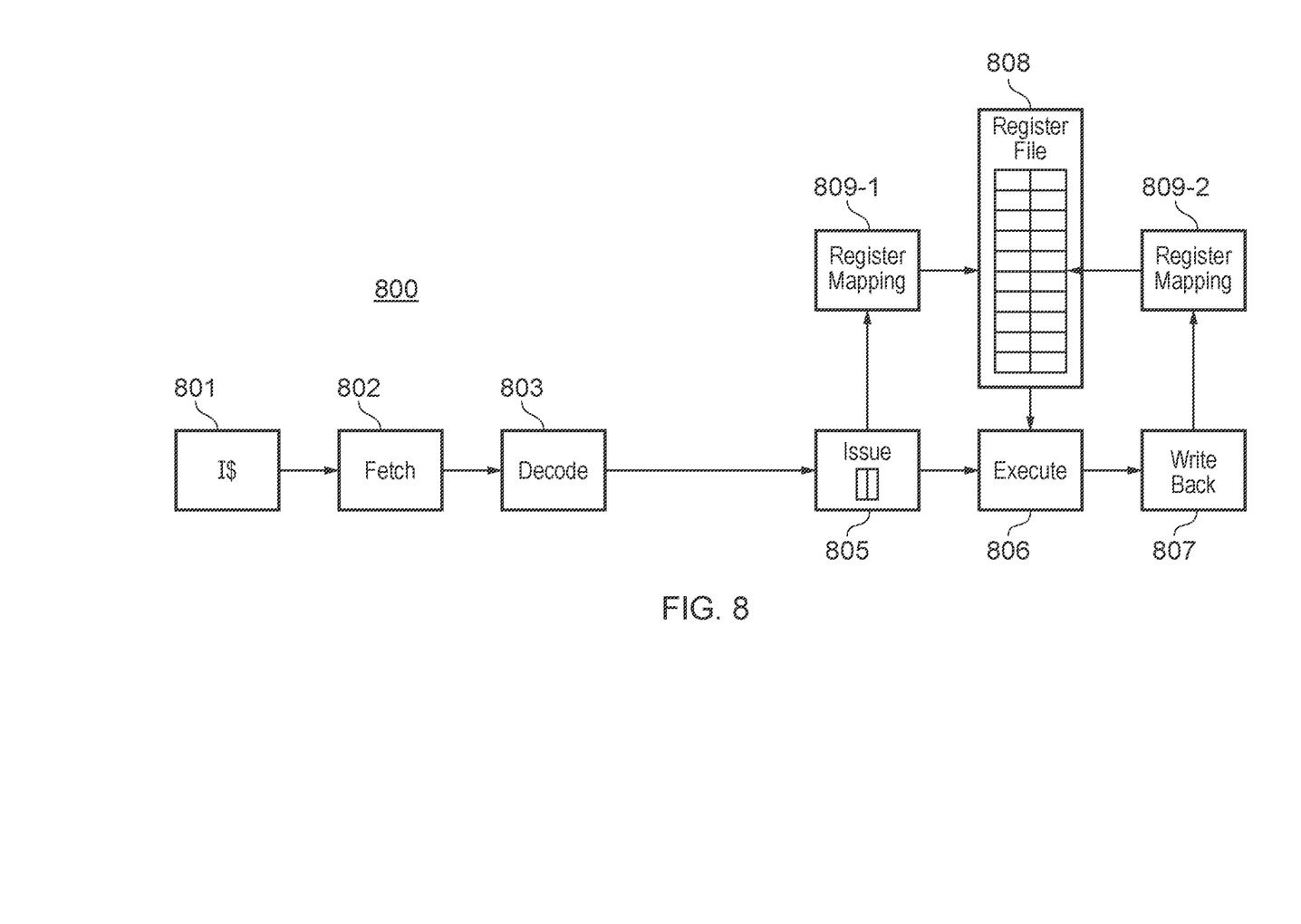
FIG. 8 schematically illustrates an instruction pipeline and shows the mapping of register specifiers to registers in a register file, according to one example.

FIG. 8 schematically illustrates an instruction pipeline 800 of an example of an apparatus of the present technique, for performing data processing operations in response to program instructions fetched from an instruction cache 801. In this example, the pipeline 800 includes a fetch stage 802, a decode stage 803, and an issue stage 805. The fetch stage 802 fetches program instructions to be executed from the instruction cache 801. The fetch stage 802 may include a branch predictor for predicting outcomes of branch instructions in order to track non-sequential program flow, to generate a series of fetch addresses of instructions to be executed. The instructions that are fetched by the fetch stage are passed to the decode stage 803, which decodes the instructions to map them to operations to be passed to remaining stages of the pipeline 800. The decoded operations are passed to an issue stage 805 which queues the operations while awaiting execution, until their required input operands are available. When the instructions requiring an operand to be read from the register file 808 are issued to the execute stage, they are passed to register mapping circuitry 809-1 to map architectural register specifiers identified by the instructions to physical registers of the register file 808, e.g. using any of the mapping examples discussed above. The execute stage 806 may then include a number of separate execution pipelines or functional units corresponding to different types of operations to be executed and accesses the physical registers in the register file 808 based on the register mapping. The execute pipelines could include at least one integer pipeline for executing arithmetic or logical operations on integer operands, at least one floating-point pipeline for executing arithmetic or logical operations on floating-point operands, a load/store pipeline for handling load operations for transferring data from a memory system to the registers 808 or store operations for storing data from the registers 808 to the memory system, and so on. In this example, the memory system includes the instruction cache 801, and may further include a level one data cache, a level two cache shared for instructions and data, and main memory (which are not shown in FIG. 8 for conciseness). It will be appreciated that this is just one example of a possible cache hierarchy and other implementations may use different numbers of caches and different numbers of levels of caches. Finally a write back stage 807 is provided to write back the result of the execute stage 806 to registers 808. Another register mapping circuit 809-2 is accessible by the write back stage and maps an architectural register specifier identifying the destination register of an executed instruction to the physical register in which the result of the instruction is to be stored in the register file 808.

Figure 9:
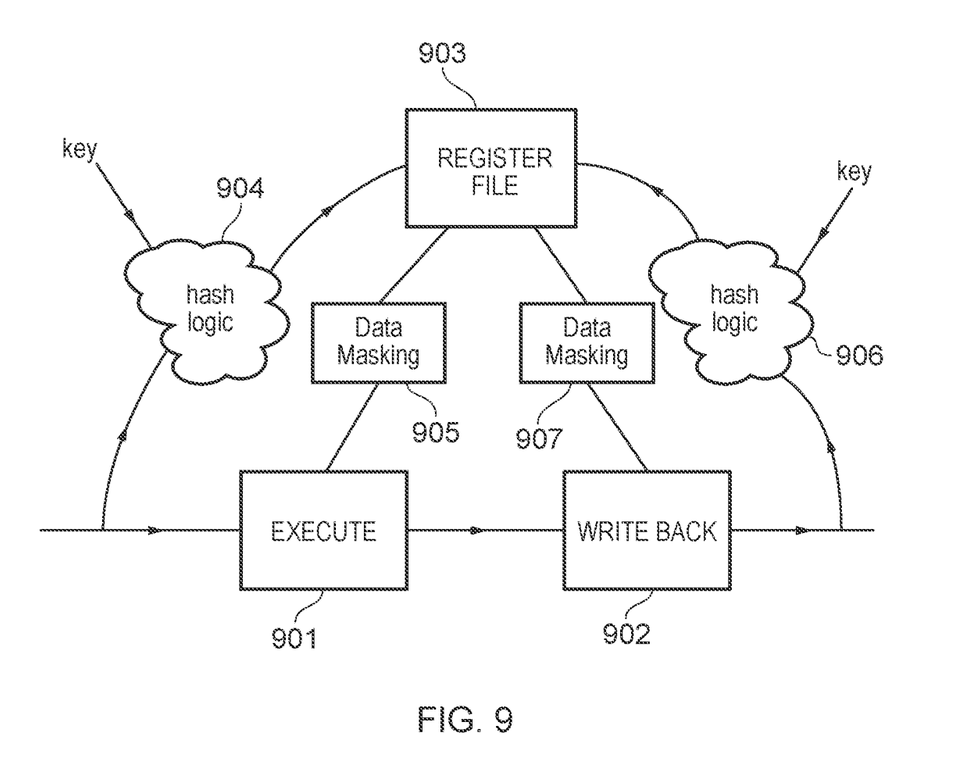
FIG. 9 illustrates a portion of an instruction pipeline and illustrates hash logic providing a masking function to mask data to be stored in registers in a register file.

FIG. 9 illustrates a portion of the instruction pipeline 800 including an execute stage 901 and a write back stage 902 to show the use of hash logic to mask data stored in a register file 903. In this case, hash logic 904 is provided on the input side of the execute stage 901 and is provided with a key to determine the register index of the data to be retrieved from the register file 903. In some examples, the hash logic 904 is the mapping function 301 described previously. A masked data value is retrieved from the register file output by the hash logic 904 and is passed to a data masking unit 905 to unmask (decrypt) the masked data. The data masking unit 905 may store a masking key in a set of flip-flops or may alternatively be passed a key from another part of the pipeline 800. The data masking unit 905 is then able to pass an unmasked value to the execute stage 901 for execution. The resultant value of this stage is passed to the write back stage 902 whereupon the resultant value is re-masked (encoded) by a data masking unit 907 and stored in a register indicated by the hash logic (906). It will be appreciated that hash logic 904 and hash logic 906 may be the same physical hardware in the pipeline 800, but have a configurable mode of operation. Likewise, it will be appreciated that data masking unit 905 and data masking unit 907 may be the same physical hardware in the pipeline 800, but have a configurable mode of operation. Accordingly, it is possible to provide a pipeline 800 which provides both data masking and register mapping capability.

Figure 10:
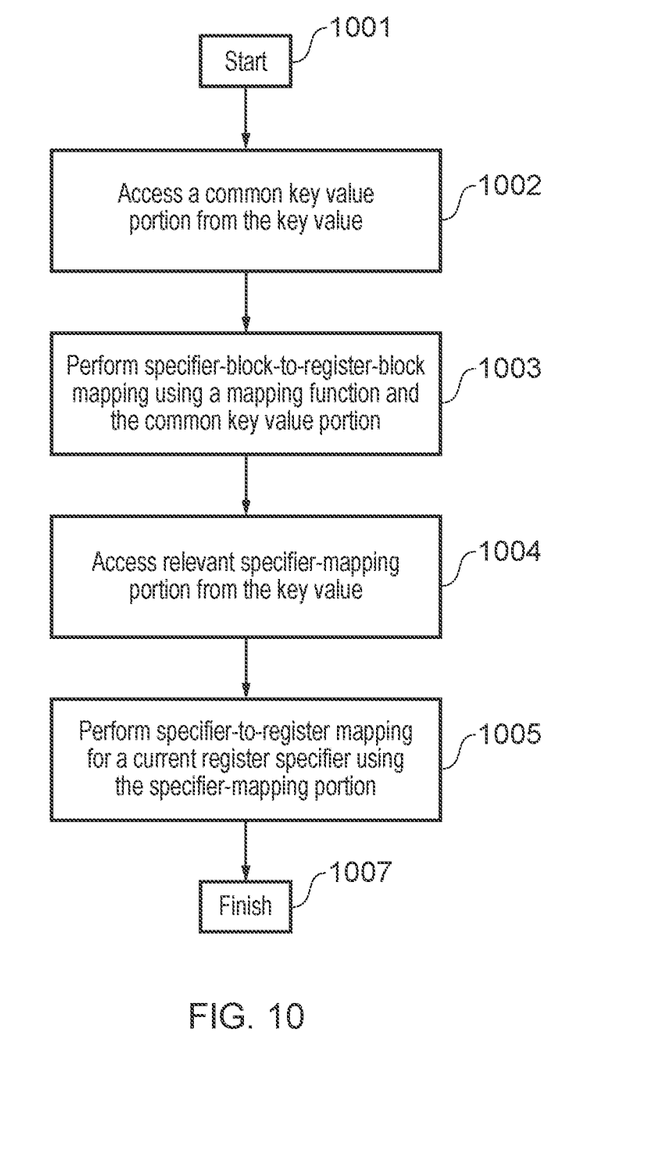
FIG. 10 is a flow diagram to illustrate the behaviour of a mapping operation according to one example.

FIG. 10 illustrates a method of operating an apparatus according to one example, which starts at step 1001 and comprises the steps of: in step 1002, accessing a common key value portion from the key value; in step 1003, performing specifier-block-to-register-block mapping using a mapping function and the common key value portion; in step 1004, accessing a specifier-mapping portion from the key value, selected dependent on the bits of the register specifier remapped using the common key value portion; and in step 1005, performing specifier-to-register mapping using the specifier-mapping portion. The method finishes at step 1007. It will be appreciated that steps 1004 and 1005 could be performed in parallel with steps 1002 and 1003.

Figure 11:
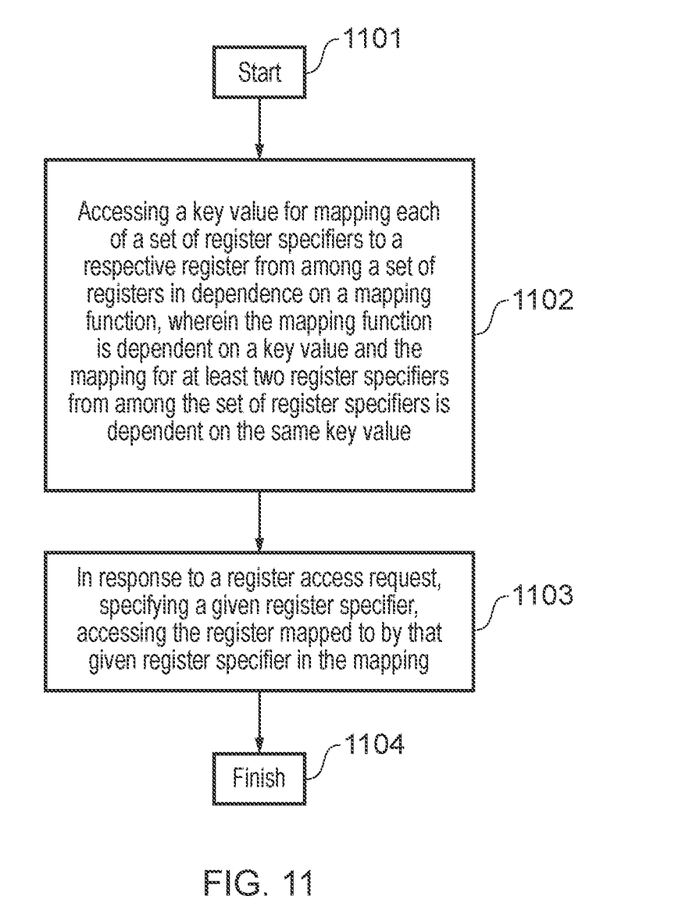
FIG. 11 is a flow diagram to illustrate the behaviour of a mapping operation according to another example.

FIG. 11 illustrates another method of operating an apparatus according to one example, which starts at step 1101 and comprises the steps of: in step 1102, accessing a key value for mapping each of a set of register specifiers to a respective register from among a set of registers in dependence on a mapping function, wherein the mapping function is dependent on a key value and the mapping for at least two register specifiers from among the set of register specifiers is dependent on the same key value; and, in step 1103, in response to a register access request, specifying a given register specifier, and accessing the register mapped to by that given register specifier in the mapping. The method finishes at step 1104.

In brief overall summary there is provided an apparatus comprising: a set of registers; and mapping circuitry to perform a mapping operation to map each of a set of register specifiers to a respective register from among the set of registers in dependence on a mapping function. The mapping function is dependent on a key value. In addition, the mapping for at least two register specifiers from among the set of register specifiers is dependent on the same key value.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a set of registers; and
mapping circuitry to perform a mapping operation to map each of a set of register specifiers to a respective register from among the set of registers in dependence on a mapping function, wherein the mapping function is dependent on a key value, wherein the key value used for the mapping function is the same for at least two register specifiers from among the set of register specifiers;
wherein the mapping circuitry is arranged to select a subset of the key value to use for the mapping function for a particular register specifier, the subset of the key value selected in dependence on the particular register specifier; and
the mapping circuitry is configured to map a subset of bits of the particular register specifier to corresponding bits of a register index using a common key value portion used by all of the set of register specifiers, and to select the subset of the key value used to map remaining bits of the particular register specifier in dependence on said subset of bits of the particular register specifier.

2. The apparatus of claim 1, wherein the set of registers comprises a plurality of register blocks and the set of register specifiers comprises a plurality of register specifier blocks, and the mapping circuitry is configured to determine a specifier-block-to-register-block mapping,
wherein the specifier-block-to-register-block mapping maps a selected register specifier block to a corresponding register block.

3. The apparatus of claim 2, wherein the specifier-block-to-register-block mapping is determined in dependence on the mapping function and the common key value portion of the key value used by all of the set of register specifiers.

4. The apparatus of claim 2, wherein the key value comprises a plurality of specifier-mapping portions and a given specifier-mapping portion from among the plurality of specifier-mapping portions is used for the mapping function for each register specifier within a corresponding register specifier block.

5. The apparatus of claim 4, further comprises mapping update circuitry to perform a mapping update operation to update at least a portion of the key value to change a specifier-to-register mapping for a plurality of register specifiers from among the set of register specifiers,
  wherein the mapping update circuitry performs the mapping update operation to update a selected specifier-mapping portion from among the plurality of specifier-mapping portions.

6. The apparatus of claim 1, wherein the mapping function comprises a bijective function.

7. The apparatus of claim 1, wherein the mapping circuitry is configured to determine a register index of a physical register to be accessed in dependence on a given operation applied to a target register specifier and the key value, said given operation comprising at least one of:
  an XOR operation, and
  an addition operation.

8. The apparatus of claim 1, further comprising mapping update circuitry to perform a mapping update operation to update at least a portion of the key value to change a specifier-to-register mapping for a plurality of register specifiers from among the set of register specifiers.

9. The apparatus of claim 8, wherein the mapping update circuitry is configured to perform the mapping update operation in response to at least one of:
  a predetermined event which causes the registers within at least a subset of the set of registers to contain at least one of: identical values, and respective dummy values, and
  a hardware reset event.

10. The apparatus of claim 9, wherein said predetermined event comprises an interrupt.

11. The apparatus of claim 8, wherein the mapping update circuitry is configured to perform the mapping update operation in response to a remap instruction.

12. The apparatus of claim 11, wherein in response to the remap instruction, the mapping update circuitry is configured to trigger changing of the position of register data in each of the set of registers according to a new mapping.

13. The apparatus of claim 11, wherein in response to the remap instruction, the mapping update circuitry is configured to trigger setting of register data in each of the set of registers to be at least one of: identical values, and respective dummy values.

14. The apparatus of claim 1, wherein the number of registers in the set of registers matches the number of register specifiers in the set of register specifiers.

15. The apparatus of claim 1, further comprising:
  data masking circuitry to transform data written to, or read from, a given register according to a masking key value.

16. The apparatus of claim 15, wherein the apparatus further comprises:
  mask-update circuitry to change the masking key value in response to a mask-update trigger condition.

17. The apparatus of claim 1, wherein the mapping circuitry performs the mapping operation during at least one of an issue stage, execute stage and write-back stage in an instruction pipeline.

18. A method of operating an apparatus, comprising the steps of:
  accessing a key value for mapping each of a set of register specifiers to a respective register from among a set of registers in dependence on a mapping function, wherein the mapping function is dependent on the key value, wherein the key value used for the mapping function is the same for at least two register specifiers from among the set of register specifiers; and
  in response to a register access request specifying a given register specifier, accessing the register mapped to by that given register specifier in the mapping;
  wherein a subset of the key value is selected to use for the mapping function for a particular register specifier, the subset of the key value selected in dependence on the particular register specifier;
  a subset of bits of the particular register specifier are mapped to corresponding bits of a register index using a common key value portion used by all of the set of register specifiers; and
  the subset of the key value is used to map remaining bits of the particular register specifier, and the subset of the key value is selected in dependence on said subset of bits of the particular register specifier.

19. The apparatus according to claim 1, further comprising:
  instruction decoder circuitry to decode instructions; and
  key change circuitry;
  wherein the instruction decoder circuitry is responsive to a key change instruction to generate control signals to control the key change circuitry to change the key value.

* * * * *